United States Patent
Garvey

(10) Patent No.: US 11,880,572 B2
(45) Date of Patent: Jan. 23, 2024

(54) CACHE REFRESH SYSTEM AND PROCESSES

(71) Applicant: ADP, Inc., Roseland, NJ (US)

(72) Inventor: Stephen D. Garvey, Smyrna, GA (US)

(73) Assignee: ADP, Inc., Roseland, NJ (US)

( * ) Notice: Subject to any disclaimer, the term of this patent is extended or adjusted under 35 U.S.C. 154(b) by 65 days.

(21) Appl. No.: 17/476,231

(22) Filed: Sep. 15, 2021

(65) Prior Publication Data

US 2023/0081780 A1 Mar. 16, 2023

(51) Int. Cl.
| | | |
|---|---|---|
| G06F 12/00 | (2006.01) | |
| G06F 3/06 | (2006.01) | |
| G06F 12/0831 | (2016.01) | |

(52) U.S. Cl.
CPC .......... *G06F 3/0617* (2013.01); *G06F 3/0604* (2013.01); *G06F 3/0613* (2013.01); *G06F 3/0659* (2013.01); *G06F 3/0673* (2013.01); *G06F 12/0833* (2013.01)

(58) Field of Classification Search
CPC .... G06F 3/0617; G06F 3/0604; G06F 3/0613; G06F 3/0659; G06F 3/0673; G06F 12/0833
See application file for complete search history.

(56) References Cited

U.S. PATENT DOCUMENTS

| | | | | |
|---|---|---|---|---|
| 5,907,681 | A   * | 5/1999  | Bates       | G06F 9/451 709/228 |
| 8,925,099 | B1 * | 12/2014 | Saxe        | G06F 21/6245 713/187 |
| 9,830,228 | B1 * | 11/2017 | Chopra      | G06F 11/1464 |
| 9,881,682 | B1 * | 1/2018  | Tang        | G06F 3/0659 |
| 10,861,092 | B1 * | 12/2020 | Misra       | G06N 7/01 |
| 2002/0080508 | A1 * | 6/2002  | Alex        | G11B 27/36 |
| 2003/0151621 | A1 * | 8/2003  | McEvilly    | H04N 21/47202 348/E7.071 |
| 2003/0182493 | A1 * | 9/2003  | Frame       | G11C 11/406 711/100 |
| 2003/0204669 | A1 * | 10/2003 | Ranganathan | G06F 13/1636 711/167 |
| 2004/0148410 | A1 * | 7/2004  | Howard      | G06F 21/31 709/229 |
| 2005/0068826 | A1 * | 3/2005  | Hoehler     | G11C 11/40622 365/203 |
| 2011/0087732 | A1 * | 4/2011  | Lakshmanan  | H04L 67/1001 709/204 |
| 2011/0246713 | A1 * | 10/2011 | Bains       | G11C 7/22 711/E12.001 |
| 2012/0109902 | A1 * | 5/2012  | Rozensztejn | H04W 4/60 707/689 |

(Continued)

*Primary Examiner* — Shawn X Gu
*Assistant Examiner* — Mohammad S Hasan
(74) *Attorney, Agent, or Firm* — Foley & Lardner LLP

(57) ABSTRACT

The present disclosure relates generally to computer systems and, more particularly, to a cache refresh system and related processes and methods of use. The method of refreshing data in cache memory includes: setting, by a computer system, a refresh indicator to "true"; refreshing data in the cache memory, by the computer system, upon a determination that the refresh indicator is set to "true"; and setting, by the computer system, the refresh indicator to "false" after the refreshing of the cache memory.

20 Claims, 6 Drawing Sheets

(56) References Cited

U.S. PATENT DOCUMENTS

| | | | | |
|---|---|---|---|---|
| 2014/0123054 A1* | 5/2014 | Cai | ...................... | G06F 3/0482 |
| | | | | 715/779 |
| 2016/0366240 A1* | 12/2016 | Haapanen | ............... | H04L 41/22 |
| 2017/0353577 A1* | 12/2017 | Lutz | .................... | H04L 67/5682 |
| 2019/0294364 A1* | 9/2019 | Wang | .................... | G06F 3/0625 |
| 2021/0149906 A1* | 5/2021 | Li | ..................... | G06F 16/24539 |
| 2022/0083475 A1* | 3/2022 | Onishi | ................ | G06F 12/0833 |
| 2022/0083536 A1* | 3/2022 | Hogan | ................ | G06F 16/2379 |

\* cited by examiner

CACHE REFRESH SYSTEM AND PROCESSES

TECHNICAL FIELD

The present disclosure relates generally to computer systems and, more particularly, to a cache refresh system and related processes and methods of use.

BACKGROUND

Many software systems are characterized by a subset of users that login every day to access data and perform tasks. These daily users tend to login during the same time of day such as every morning when they start work. This causes a spike in system resource usage which can strain the system and limit how many new users can be added to the network.

Caching the data retrieved by the system can help with the resource usage. For example, due to the high request rates or TOPS (Input/Output operations per second) supported by RAM and In-Memory engines, as examples, caching can improve data retrieval performance and reduce cost at scale. To support the same scale with traditional databases and disk-based hardware, additional resources would be required. These additional resources drive up cost and still fail to achieve the low latency performance provided by an In-Memory cache.

But it is also known that if the cached data is not automatically updated (which is sometimes not feasible), then the data becomes stale and needs to be refreshed. If the cache refresh happens on demand, then for daily users this would normally happen when they first access the system for the day because the data has become stale since last accessed the prior day. The cache refresh thus causes the same resource usage spike during the morning period when the daily users are first accessing the system.

A solution when an automatic refresh is not feasible is pro-actively refreshing the cache to spread out the resource usage so that the data is not stale when the user first accesses the system in the morning. In implementation, automatic refresh requires tracking system usage to determine which users are active. This, however, can become expensive and complicated to implement. Also, implementing certain rules requires counters that are only incremented once a day and that are reset every month, again making the cache refresh system complicated and costly.

SUMMARY

In a first aspect of the present disclosure, a method of refreshing data in cache memory comprises: setting, by a computer system, a refresh indicator to "true"; refreshing data in the cache memory, by the computer system, upon a determination that the refresh indicator is set to "true"; and setting, by the computer system, the refresh indicator to "false" after the refreshing of the cache memory.

In another aspect of the present disclosure, there is a computer program product for refreshing data. The computer program product includes one or more computer readable storage media having program instructions collectively stored on the one or more computer readable storage media. The program instructions are executable to: set a refresh indicator in a cache memory to "true" upon a login of a user; refresh data in the cached memory during non-peak usage of system resources when the refresh indicator is set to "true" and at a time in which the data will not become stale during a next login of the user; and set the refresh indictor to "false" upon the refreshing of the data in the cache memory, indicating another refresh is not authorized.

In a further aspect of the present disclosure, there is a computer system for refreshing cache data. The system includes a processor, a computer readable memory, one or more computer readable storage media, and program instructions collectively stored on the one or more computer readable storage media. The program instructions are executable to: read cache data from a cache memory of a user; determine whether the cache data in the cache memory is stale and, if so, refresh the cache data with updated data from a storage system remote from the cache memory; when the cache data is not stale, set a refresh indicator to "true" and write the "true" into the cache memory; and perform a bulk refresh process of the cache data in the cache memory comprising: reading the cache memory to determining that the refresh indicator is "true"; refreshing the cache data in the cache memory with updated information within a time period in which the update information will not become stale for when a user next requires the cache data; and resetting the refresh indicator to "false" subsequent to the refreshing of the cache data in the cache memory.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION OF ASPECTS OF THE INVENTION

Figure 1:
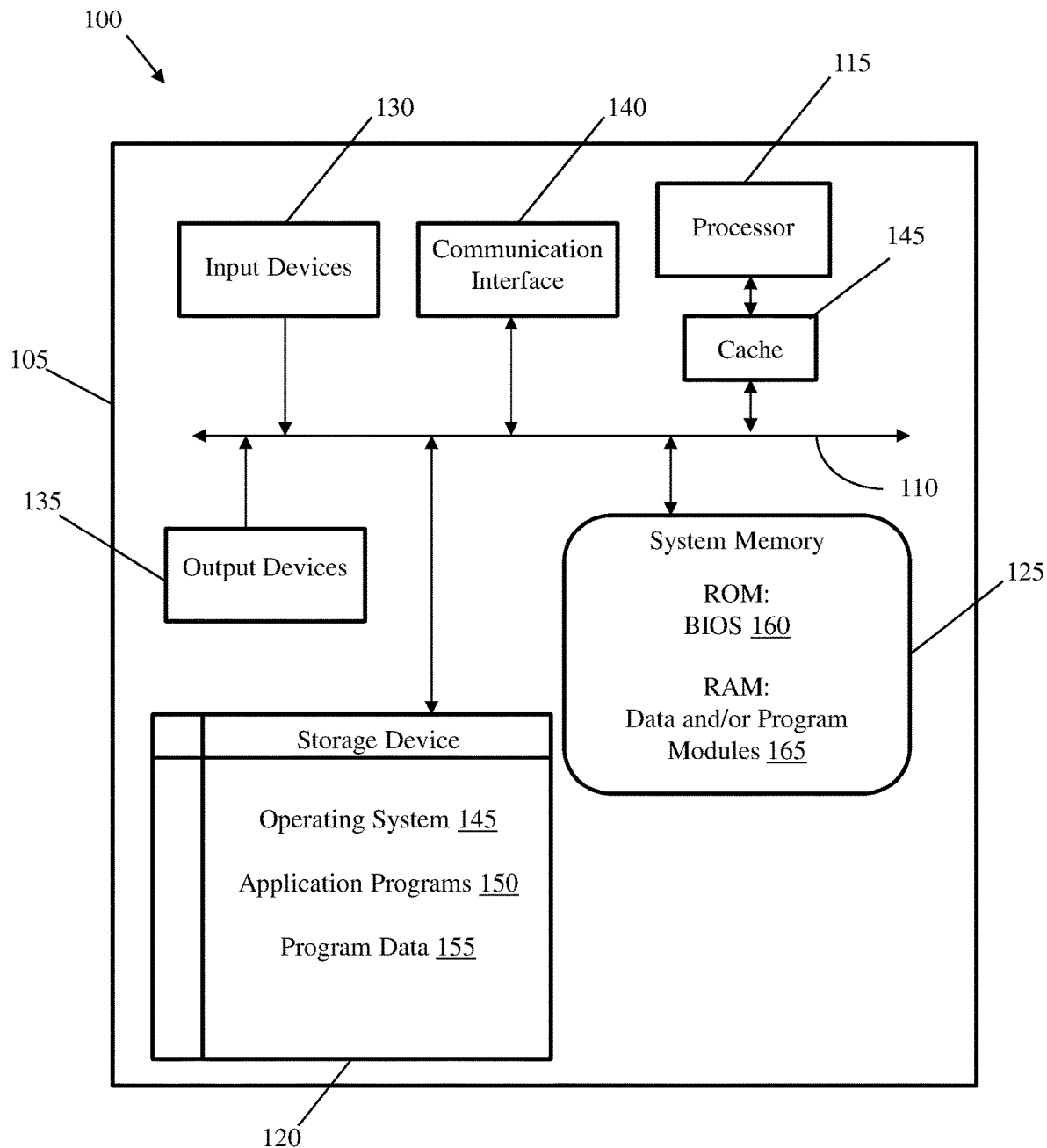
FIG. 1 is an illustrative architecture of a computing system implemented in embodiments of the present disclosure.

The present disclosure relates generally to computer systems and, more particularly, to a cache refresh system and related processes and methods of use. More specifically, the cache refresh comprises a system and/or process and/or computer program product which proactively refreshes cached data (e.g., aggregation of user permissions for different computing systems or products) for daily users with minimal history requirements. Accordingly, and advantageously, the cache refresh described herein will improve resource usage by reducing resource usage spikes during peak usage times, while ensuring that the most updated data is available to a user during a login process or other data access point (e.g., requesting permission to different products and/or systems). In addition, the cache refresh does not require tracking or counter systems, hence reducing overall costs.

As should be understood by those of skill in the art, in computing systems, a cache is a high-speed data storage layer which stores a subset of data, typically transient in nature, so that future requests for that data are served up faster than is possible by accessing the data's primary storage location. Data in cache is generally stored in fast access hardware such as RAM (Random-access memory) and may also be used in correlation with a software component. With this noted, in embodiments, the solution presented herein, i.e., cache refresh, provides a very simple way to approximate daily users and proactively refresh their cached data during non-peak times (e.g., overnight when users are typically logged off of the system) in order to reduce daily spikes and, thereby, result in a more efficient usage of system resources.

For example, in embodiments, the cache refresh is configured to track daily users with minimal amount of complexity and history by using a single refresh indicator on a user's cached data. In implementation, for example, anytime the cached data is retrieved for a user, the single refresh indicator may be set to true, i.e., the user accessed the data that day. This, in turn, triggers the cache refresh to provide an automatic refresh update of the data during a non-peak time of computer usage, i.e., during the evening or early morning hours when system resources may be underutilized. In this way, the next time the user accesses the data, e.g., logs into the system the next day, the data will have already been refreshed, thus reducing overall computing resources (e.g., reducing spikes) during peak usage times. This will also ensure that the user is provided with fast access to computing resources.

In embodiments, the use of the single refresh indicator approximates which users will log on or require access to cached data the next working day. To this end, there are some days when a daily user may not access the computing system. In this scenario, the user's data will not automatically be refreshed during the following non-peak refresh cycle, i.e., the following night. As the data was not refreshed, it will need to be refreshed in the normal course of business, e.g., next log in event; however, as the cache refresh has already been refreshed for other users during non-peak times, system resources will remain available for the refresh cycle of the user's data without overtaxing resources. Also, as the single refresh indicator has now been triggered, e.g., true, the nightly or off-peak refresh will resume, thus providing faster access the next day.

Likewise, there will also be a number of non-daily users who access the computing system on a given day even though they do not access the computing system every day. These non-daily users may be included in the non-peak refresh even though they probably will not access the computing system the next day. Although this refresh may not be necessary for such non-daily users, it has been found that treating every user who accesses the system as a daily user will keep the solution simple and provide superior management of system usage from a peak system resource standpoint.

Accordingly, the cache refresh provides a technical solution for managing computing resources and hence reducing spikes and allowing faster access times. For example, and as described in more detail herein, the cache refresh allows faster access to data when users log into their computing system or at other data access points. This technical solution requires implementation in a computing resource through the use of a system, a method, and/or a computer program product as described herein. The computer program product may include a computer readable storage medium (or media) having computer readable program instructions thereon for causing a processor to carry out aspects of the present disclosure.

Computing Infrastructure and Related Functionality

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
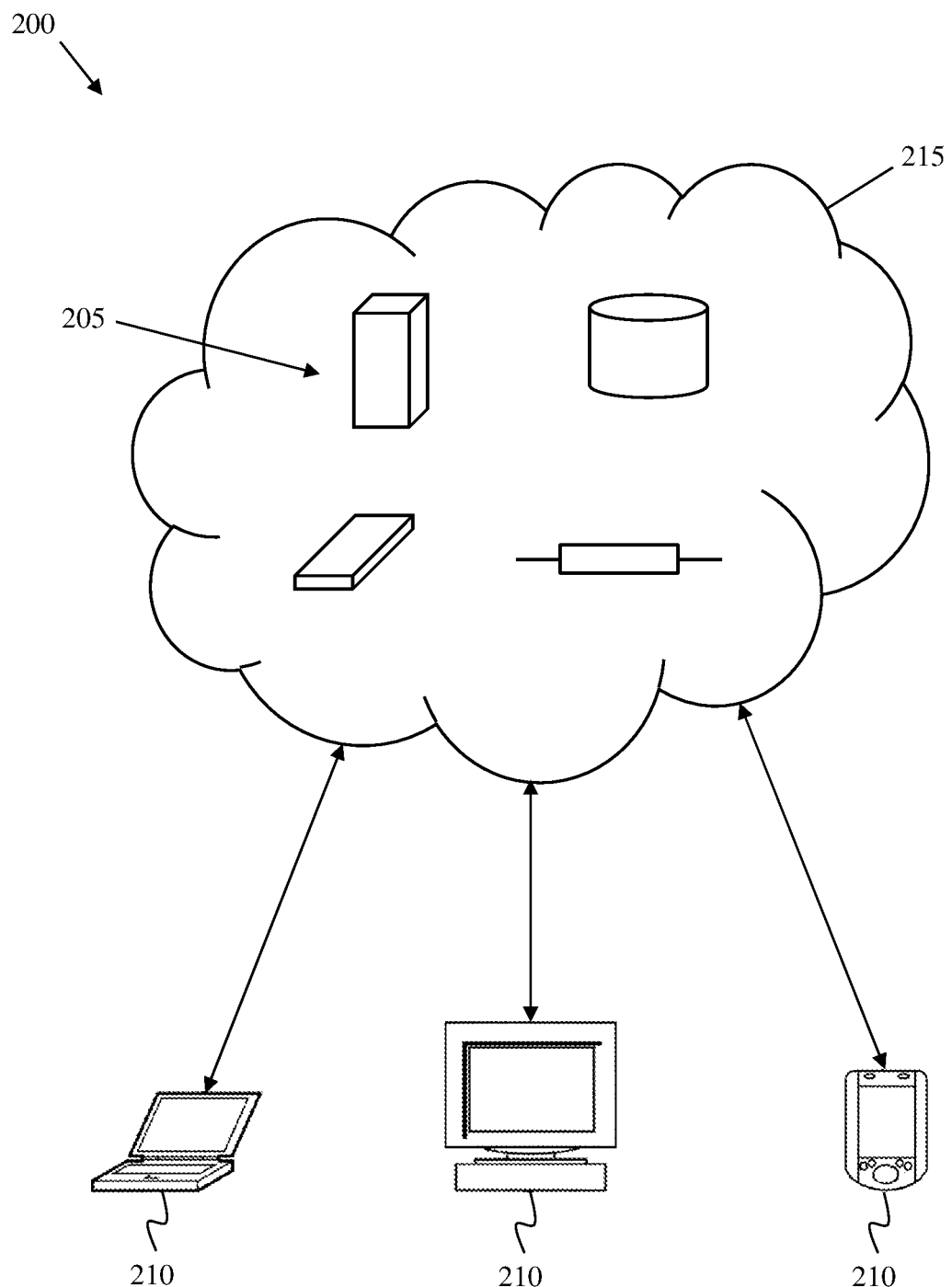
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third-party service provider). The computing device 105 may include a bus 110, a processor 115, a storage device 120, a system memory (hardware device) 125, one or more input devices 130, one or more output devices 135, a communication interface 140 and cache memory 145.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example, processor 115 enables the computing device 105 to refresh data stored in cache memory 145 during times of non-peak usage of the computing system or network, hence improving utilization of system resources. In embodiments, the data can be user permissions for different products or systems. For example, the user permissions may be used to access many back-end products such as, e.g., employee benefits, time tracking, payroll information, mobile applications, etc. Of course, the cached data can be configurable or customized by the client for different products or users in order to enable, e.g., permissions, for different users and different products. In this way, any combination of permissions or other cached data can be refreshed during non-peak times to increase log in speeds.

In embodiments, cache memory 145 can be an area of memory comprising, e.g., system memory 125 or in processor 115, itself. For example, cache memory 145 may be Level 2 cache stored between the processor and RAM. Alternatively, cache memory 145 may be Level 1 cache which comprises internal memory stored directly on processor 115. In yet another scenario, cache memory 145 may be disk cache stored in the main memory of the disk. In any scenario, cache memory 145 will store certain commonly accessed data such as user permissions to provide faster access to computing resources. For example, in implementation, data and commands that are often used for programs can be stored in cache memory 145 and refreshed during times of non-peak usage of system resources. In this way, the refreshed cache memory saves the computer user significant time in opening different products, and hence is dramatically faster than opening data that needs to be refreshed during spike usages, for example.

In embodiments, processor 115 may receive input signals from one or more input devices 130 and/or drive output signals through one or more output devices 135. These inputs may include, e.g., when a user last logged into their computing system and obtained cached data. The input will then be used to set a single refresh indicator (e.g., binary indicator) on a user's cached data to "true" which, in turn, signals the system to refresh the data in cache memory 145 during a next refresh cycle at a non-peak time of system usage. The next refresh cycle is timed to ensure that the refreshed cached data can be used before it is considered stale and would need to be refreshed again.

The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, cache memory or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM and refreshed from time to time during both peak times and non-peak times in accordance with aspects of the present disclosure.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured refresh cache memory 145 during non-peak times to reduce overall computing resources during peak usage times. For example, in embodiments, cache memory 145 may be refreshed in the evening, on the weekends, e.g., Sunday evening, during holidays or other non-peak times, based on a triggering event. Illustratively and as a non-limiting example, computing system 100 and, more particularly, processer 115 may detect a user login which, in turn, will trigger a refresh command to refresh the cache memory at a later time. This login may be detected by keystrokes, e.g., entering of user ID/password, or turning on of the computing system 100, itself.

Accordingly, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 (also known as distributed computing environment) includes cloud resources 205 that are made available to client devices 210 via a network 215, such as the Internet. Cloud resources 205 can include a variety of hardware and/or software computing resources, such as servers, databases, cache memory, storage, networks, applications, and platforms. In embodiments, the cache memory may also be resident on the client devices 210. In a distributed computing environment such as shown in FIG. 2, a dedicated caching layer may be run independently of the client devices 210. In these cases, the cache memory serves as a central layer that can be accessed from disparate systems. In a distributed caching environment, the data can span multiple cache servers and be stored in a central location for the benefit of all the users of that data.

Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
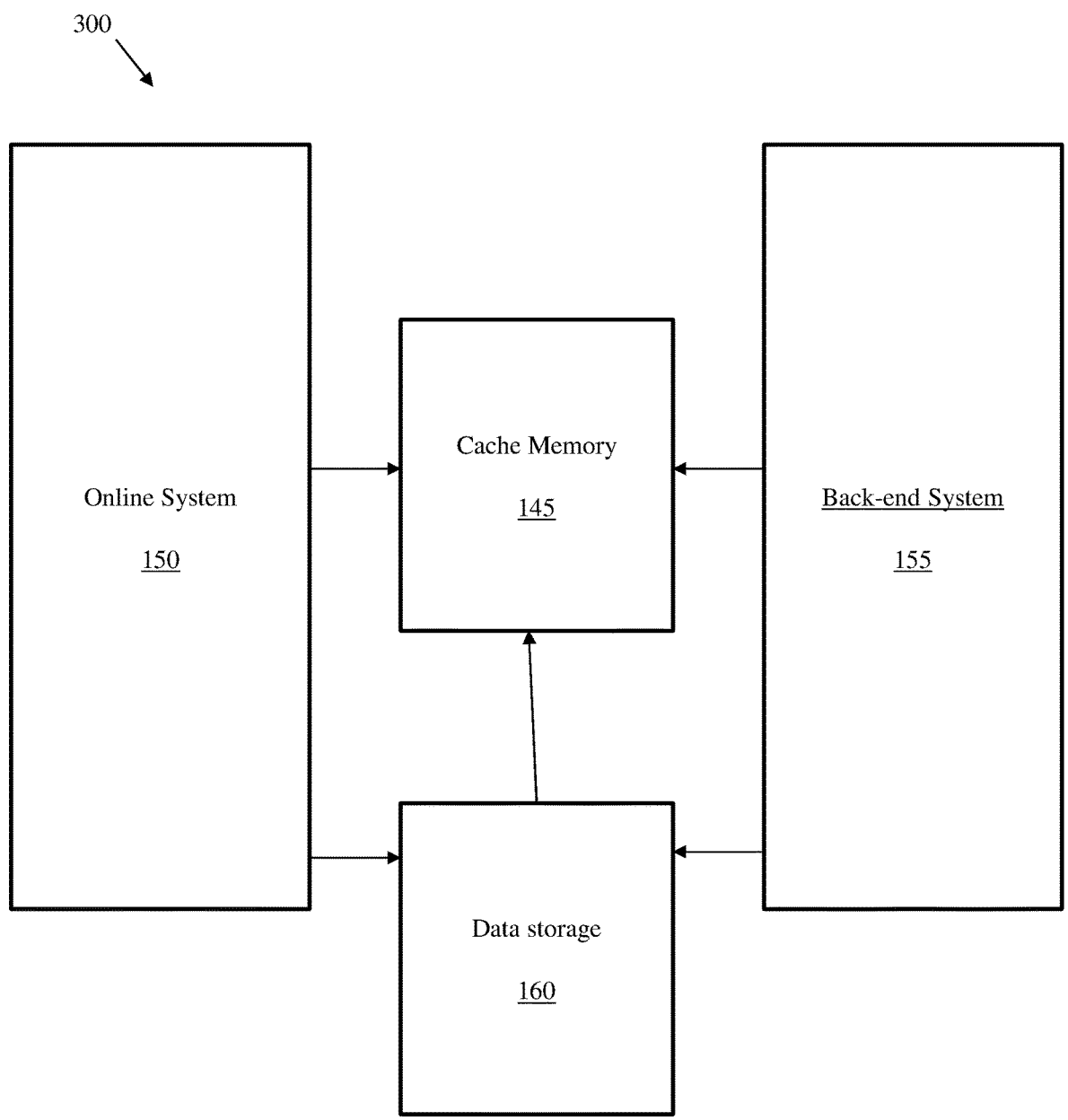
FIG. 3 shows a block diagram in accordance with aspects of the present disclosure.

FIG. 3 shows a block diagram that illustrates functionality in accordance with aspects of the present disclosure. In embodiments, functional block diagram 300 comprises cache memory 145, an online system 150, a backend system 155 and data storage 160, each of which may comprise one or more program modules such as program modules 165 described with respect to FIG. 1. In embodiments, cache memory 145 may be resident on a computing device, e.g., computing device 105, which is accessible from online and backend system 155; whereas, online system 150, backend system 155 and data storage 160 may be a computing device or other resource in the cloud computing environment 200 of FIG. 2. It should also be understood that the functional block diagram 300 may include additional or fewer modules than those shown in FIG. 3. For example, each of the modules may be integrated into a single module or, alternatively, a single module may be implemented as multiple modules. Accordingly, in practice, the environment may include additional devices and/or networks; fewer devices and/or networks; different devices and/or networks; or differently arranged devices and/or networks than illustrated in FIG. 3.

Still referring to FIG. 3, cache memory 145 stores data which can be refreshed using the processes and/or systems described herein. For example, the data in cache memory 145 can be proactively refreshed with data stored in the data storage 160, with minimal history using a single refresh indicator on the user's cached data. In embodiments, the data can be refreshed for daily users during times of non-peak usage of computer resources such as a nightly cache refresh or other times when most users are typically logged off of the system. The cache refresh can be adjusted for weekends and holidays, in addition to times which ensure that the cached data will not become stale by the next time the data is needed or used by the user.

More specifically, in the online system 150, the processes may read cached data from cache memory 145. The online system 150 may determine if the cached data is stale and, if so, online system 150 may make a call to data storage 160 to update or write data to cache memory 145. If the data is not stale, online system 150 may set the refresh indicator to "true" when the user first accesses the data during the day. The online system 150 can write the "true" signal to cache memory 145, providing the indication to backend system 155 to automatically refresh the data in cache memory 145 during a batch process performed that night as an example. The online system 150 can then continue with processing.

The backend system 155 is scheduled to run a batch job to update or refresh the data in cache memory 145 at a predetermined time period, i.e., non-peak usage. For example, backend system 155 will read cache memory 145 of each user and determine whether the refresh indicator has been set to "true" for that user. Once it is determined that each cache memory 145 with a refresh indicator of "true" has been identified, backend system 155 may call the data storage 160 to refresh the data in each user's cache memory 145. As described in more detail, backend system 155 may adjust the refresh cycle for certain events such as holidays.

Exemplary Flowchart Illustrations

Figure 4:
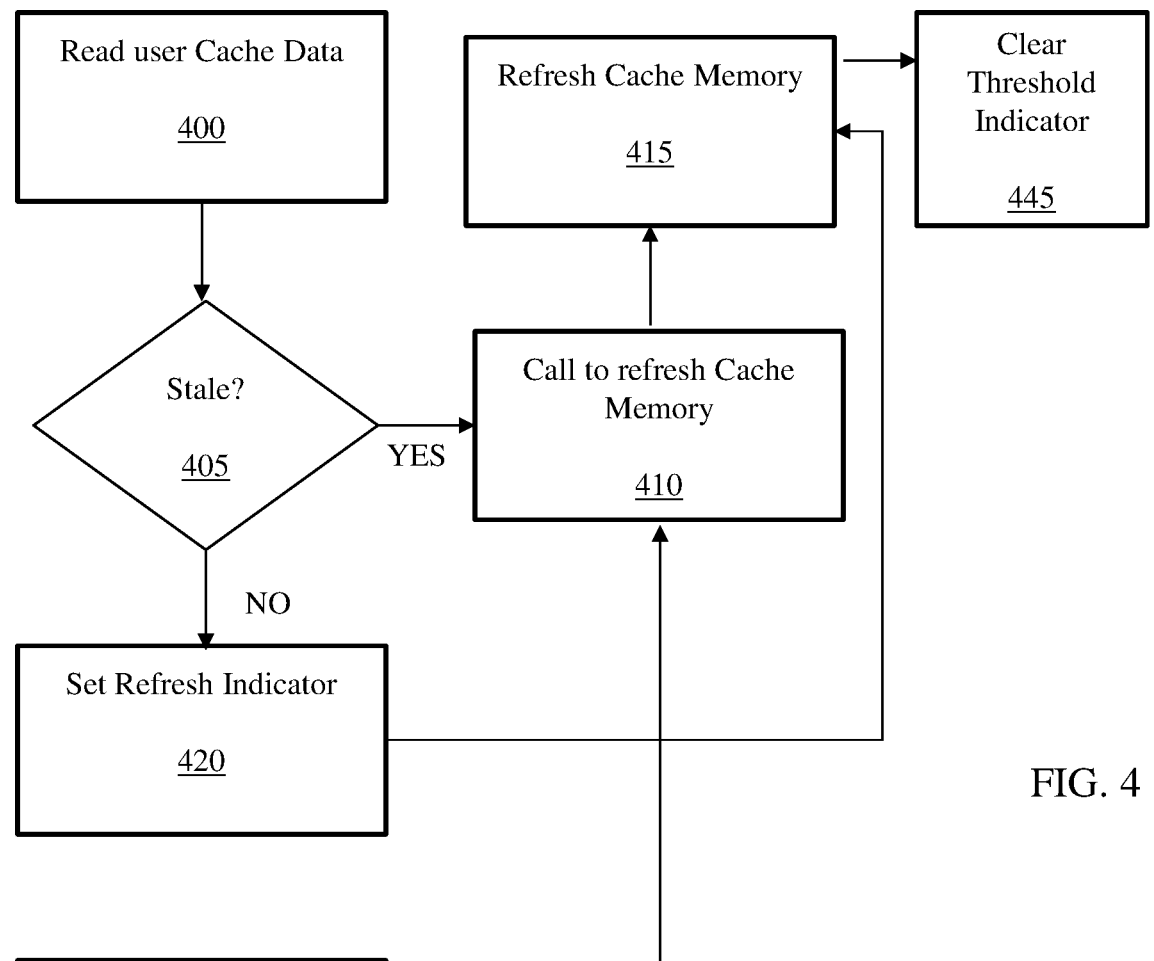
FIGS. 4-6 depict exemplary flowchart illustrations for different processes in accordance with aspects of the present disclosure.
Figure 4:
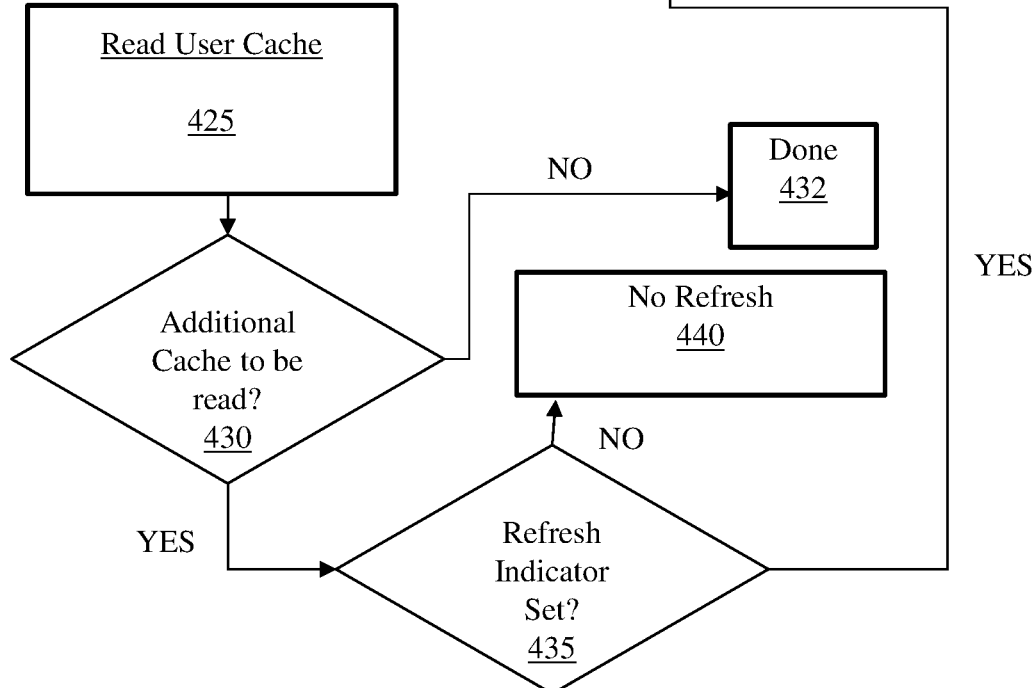
Figure 5:
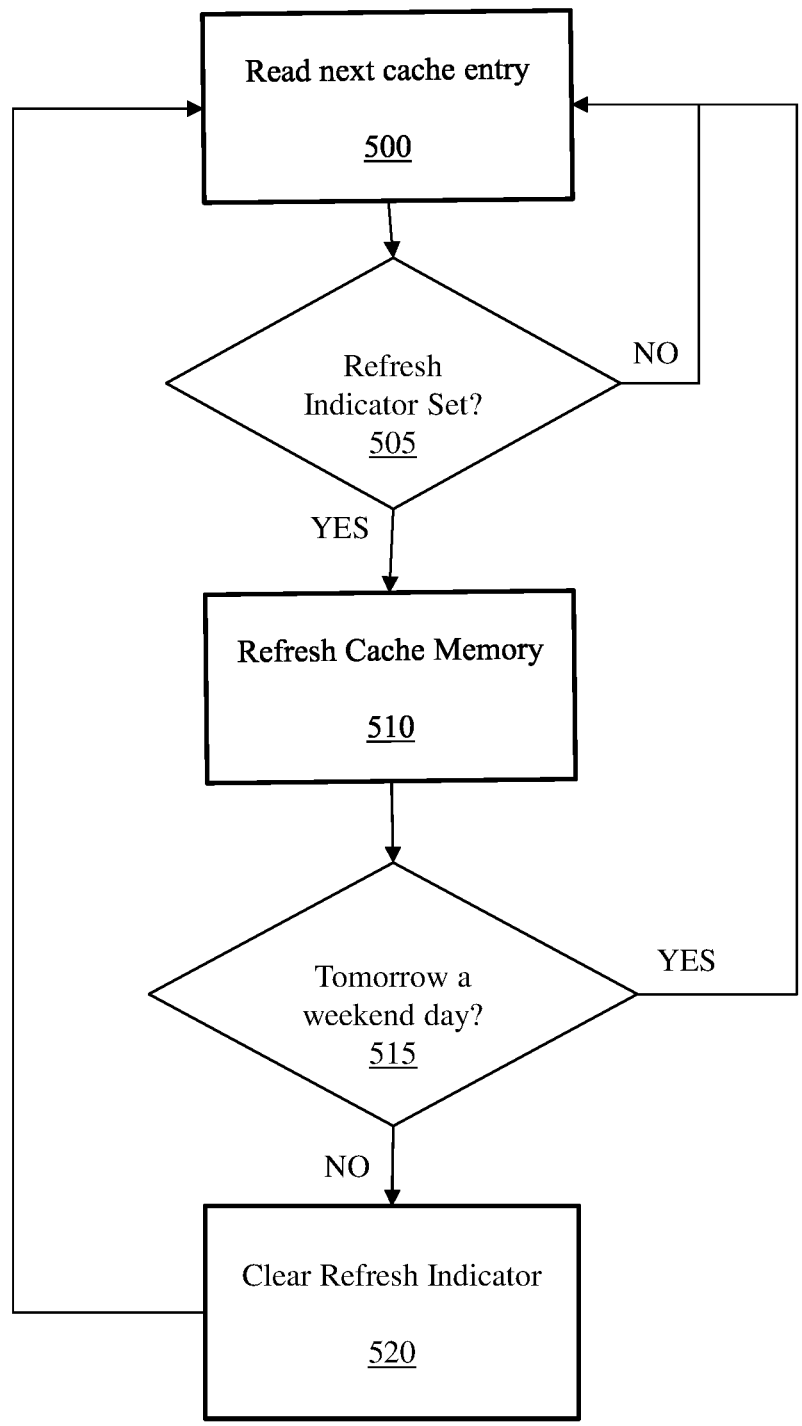
Figure 6:
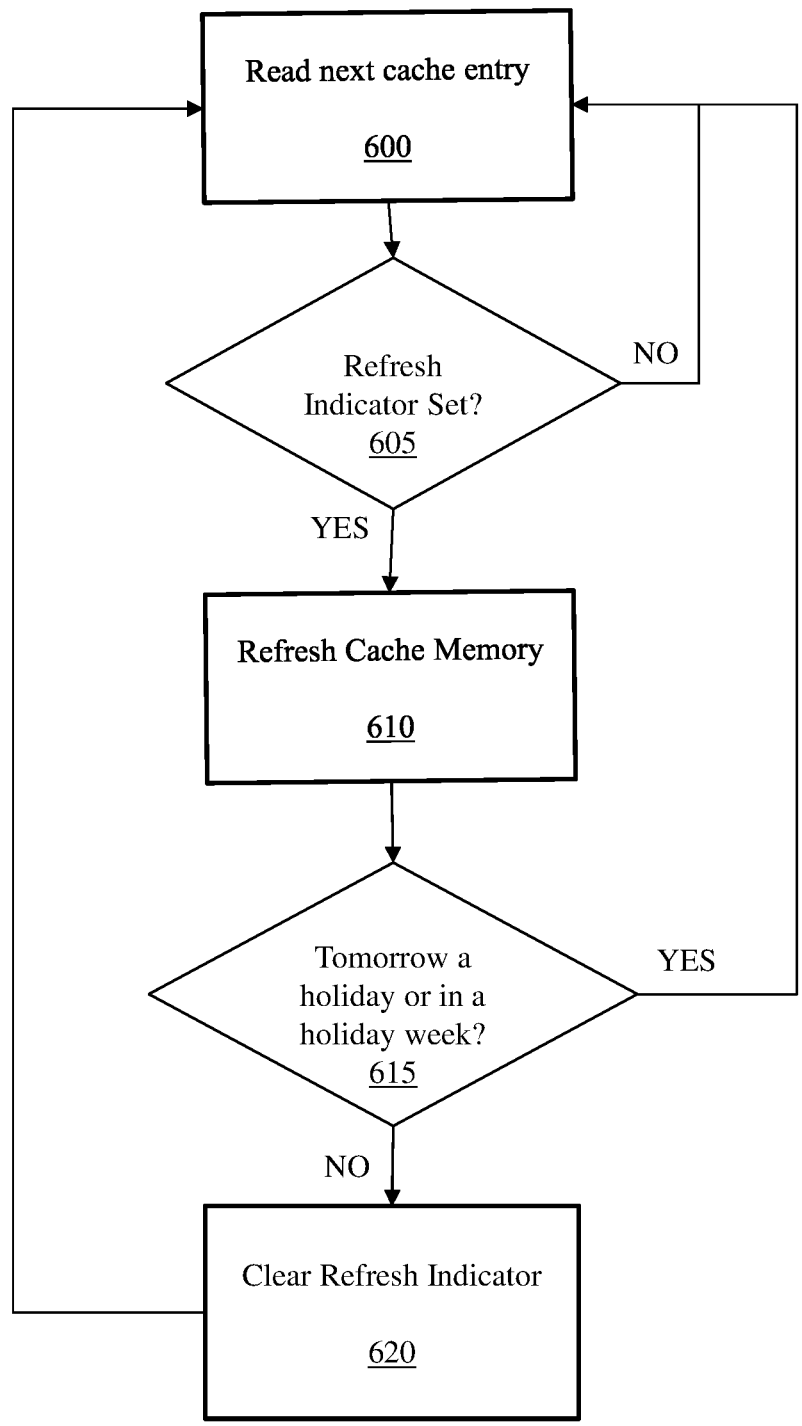

FIGS. 4-6 depict exemplary flowchart illustrations in accordance with aspects of the present disclosure. The exemplary flowchart illustrations are illustrative of an architecture, system, method, and/or computer program products in accordance with aspects of the present disclosure. In this regard, each block in the flowchart illustrations may represent a module, segment, or portion of instructions, which comprises one or more executable instructions for implementing the specified logical function(s). In implementation, the functions noted in the blocks may occur out of the order. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It is also noted that each block of the flowchart illustrations and/or combinations of blocks may be implemented by special purpose hardware-based systems that perform the specified functions or acts or carry out combinations of special purpose hardware and computer instructions.

The computer program product may include computer readable program instructions stored on computer readable storage medium (or media). The computer readable storage medium may include the one or more storage medium as described with regard to FIG. 1, e.g., non-transitory media, a tangible device, etc. The method and/or computer program product implementing the flows of FIGS. 4-6 can be downloaded to respective computing/processing devices, e.g., computing system of FIG. 1 as already described herein, or implemented on a cloud infrastructure as described with regard to FIG. 2. Accordingly, the processes associated with each flowchart illustration of the present disclosure can be implemented by special purpose hardware-based systems that perform the specified functions or acts or carry out combinations of special purpose hardware and computer instructions.

FIG. 4 shows an overview of the processes in accordance with aspects of the present disclosure. At step 400, the processes read user cached data from cache memory. At step 405, the processes determine whether the data in the cache memory is stale. If yes, at step 410, the processes call to refresh the user's cache memory. At step 415, the cache memory is updated. If the data is stale (or has not been updated), a refresh indicator will be not set to "true" and the data (e.g., permissions) from data storage will written to the cache memory at step 420. The processing on the user's computing device can continue.

At step 425, at a scheduled run time, the processes will read the cache memory. At step 430, the processes will determine whether any additional user cache entries exist. If not, the processes will end at step 432. If another user cache entry exists to be read, at step 435, a determination is made as to whether a refresh indicator has been set to "true". If not, at step 440, the processes will not provide an update of the cache memory. If the refresh indicator has been set to "true", the process will revert to step 410 at which time a call is made to refresh the user's cache memory. The processes continue to step 415, where an update of the data in the cache memory is made. At step 445, the refresh indicator is cleared.

Exemplary Uses

Daily Users

A goal of the technical solution described herein is to track daily users of computing systems in order to update data in cache memory during non-peak usages of system resources, with minimal amount of complexity and history. As noted herein, this is accomplished by using a single refresh indicator on the user's cached data. In implementation, any time the cached data is retrieved for a user, the refresh indicator is set to "true" which means the user accessed the data that day. Of course, there are some days when a daily user is off from work and thus does not access the system. In this case, the user's data will not be automatically refreshed during the following night as the refresh indicator has not been set to "true"; however, when the user first accesses the system after returning to work, the data will be refreshed at that time and, thereafter, as the refresh indicator has been set to "true", an update will be performed that evening providing faster access.

Non-Daily Users

There will be a number of non-daily users who access the system on a given day even though they do not access the system every day. These non-daily users may be included in the nightly refresh even though they probably will not access the system the next day which, technically, means the refresh was not necessary. However, treating every user who accesses the system as a daily user is a tradeoff for keeping the solution simple.

Nightly Cache Refresh for Daily Users

In implementation, each night a batch process runs against the cached data for each user and checks if the refresh indicator is set to "true". If the refresh indicator is set to "true", then the cached data is refreshed for the user and the indicator is reset to "false"; otherwise, no refresh happens. If most of the users are off on given days such as the weekends, then the batch process is scheduled to not run on the night before these off days such as Friday and Saturday since the refreshed data is not needed until Monday and can thus be taken care of on Sunday night.

For example, turning to FIG. 5, at step 500, the next cache entry is read. At step 505, a determination is made as to whether the refresh indicator has been set. If not, then the process reverts to step 500. If the refresh indicated has been set, e.g., the refresh indicator is set to "true", at step 510, the process will refresh the cache memory. At step 515, a determination is made as to whether the next day is a weekend day. This can be accomplished through a calendaring process, i.e., using a look up table, known to those of skill in the art such that no further explanation is required for a complete understanding of the present disclosure. If determined that the next day is a weekend day, the process reverts again to step 500. If not, the process continues to step 520, where the refresh indicator is cleared.

If it is refresh indicator has been set to "true" on either a Friday or Saturday, a batch process will be scheduled to run on Sunday evening, for example. This will ensure that the data does not become stale. On Sunday, for example, the processes will call to refresh the cache memory. In alternative approach, it is possible to run the refresh on a Friday or a Saturday, but not to clear the refresh indicator (similar to a holiday use case). So, for example, for days that a lot of users take off (e.g., weekends and holidays), either the job is not scheduled to run or the step to clear the refresh indicator is skipped.

Holiday Adjustment

In another example, many daily users are known to take holidays off. In this case, if the batch process runs the night before a holiday then the data will become stale. The reason is the data will not be used on the holiday and will also not get a nightly refresh before the users return to work, as the refresh indicator will not get set to "true" on the holiday. This means all daily users who are off on the holiday will need their data refreshed the first workday after the holiday which causes the same problem this invention aims to solve, i.e., reduce daily spikes resulting in a more efficient usage of system resources.

To account for this, the nightly refresh job may use a published algorithm to determine if it is running the night before an observed holiday. If it is, then it still refreshes the cached data that has the refresh indicator set to "true", but it does not reset the refresh indicator to "false". This ensures that any user who accesses their data the day before the holiday will still receive a nightly refresh the night before the first day after the holiday. For some major holidays such as Memorial Day in the United States, many users take the entire week of the observed holiday off. For these types of holidays, the solution treats any day during the work week of the observed holiday as a holiday and does not reset the refresh indicator to "false" when the nightly job runs.

For example, turning to FIG. 6, at step 600, the processes read the next cache entry. At step 605, a determination is made as to whether the refresh indicator is set. If not, the processes revert to step 600. If the refresh indicator is set, i.e., the refresh indicator is set to "true", at step 610, the processes will refresh the cache memory. At step 615, a determination is made as to whether the next day is a holiday on in a holiday week. This again can be accomplished through a calendaring process, i.e., using a look up table, known to those of skill in the art such that no further explanation is required for a complete understanding of the present disclosure. If the next day is a holiday on in a holiday week, the process reverts again to step 600. If the next day is a holiday or in a holiday week, at step 620, the refresh indicator is cleared.

In this way, the data can again be updated or refreshed the evening before returning to work, thus ensuring that the data is not stale. For a holiday that falls on a Monday, for example, the processes will revert to the processes of FIG. 5 by scheduling the refresh on Sunday at step 620; however, the refresh indicator will not be reset to "false" on Sunday, Again, in this way, the data can again be updated or refreshed the evening before returning to work, thus ensuring that the data is not stale.

Alternatively, the refresh can be scheduled for Monday and, after the refresh of the cache memory, the refresh indicator will be reset to "false" as shown by dashed line to box 620. In embodiments, it is contemplated that system maintenance will not be conducted during a holiday, so it is possible to refresh the data in a cache memory without the possibility of interrupting any system maintenance. On the other hand, system maintenance is commonly scheduled for weekends, hence in the weekend processes described in FIG. 5, the cache refresh may be reserved for Sunday, which is typically after completion of system maintenance and when system resources can be better utilized.

Integrated into a Calendar

In further contemplated embodiments, the processes described herein can be integrated into a personal or company-wide calendar system to account for vacations, medical leave, paternity/maternity leave, family care, etc. In these situations, for example, the processes described herein can determine whether a user may not be in the office the following day due to many different situations. For example, should a daily user schedule a vacation, medical leave, paternity/maternity leave, family care, etc., they can put such dates of their absence within the calendar (which is kept confidential to non-authorized users). These calendars may be associated with human resource department or be personal to the user. The processes will then query the calendar prior to a refresh cycle and schedule the refresh of the user's data, the day prior to their first day back in the office. Alternatively, the refresh cycle can mimic the functionality of a holiday schedule, where a refresh of the cache memory will be performed daily during the user's absence, but the refresh indicator will not be set to "false". This will ensure that resources are preserved across an entire enterprise.

So, in this case, the day prior to the leave, the refresh indicator may be set to "true" but knowing that the user will not be in the office for a predetermined number of days, the processes can schedule the refresh update appropriately. And, in embodiments, the refresh cycle may be similar to holidays, where the refresh indicator stays "true" for the entire leave, or alternatively, the refresh indicator may only become "true" the day prior to a return to the office. Again, in this way, the data can again be updated or refreshed the evening before returning to work, thus ensuring that the data is not stale.

Stale Time

The stale time is how long after the last refresh the cached data can be used before it is considered stale and should be refreshed again. The stale time is very important for this solution because it needs to be long enough where the nightly refresh cached data does not go stale during the day or else the cached data will need to be refreshed again and can cause the same problem that this present disclosure solves, i.e., spikes in system resources.

For example, if the nightly refresh batch process is scheduled to start at midnight, then 18 hours stale time will mean the cached data that is refreshed will be fresh until at least 6 pm which is after most daily users are finished working for the day. When the nightly rebuild runs again the following midnight, the cached data will again be stale and ready for another refresh. Even if there are some daily users who access the system after their cache data becomes stale the numbers should not be large enough to put a significant demand on system resources.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method of refreshing data in cache memory, comprising:
   setting, by a computer system, a refresh indicator to "true";
   refreshing data in the cache memory, by the computer system, upon a determination that the refresh indicator is set to "true"; and
   setting, by the computer system, the refresh indicator to "false" after the refreshing of the cache memory,
   wherein the refresh indicator remains "true" upon the refreshing of the data in the cache memory during one or more non-working days and wherein the refresh indicator resets to "false" upon the refreshing of the data in the cache memory prior to a first day after a non-working day.

2. The method of claim 1, wherein the "true" of the refresh indicator is written into and read from the cache memory.

3. The method of claim 2, wherein the "true" of the refresh indicator is read from the cache memory prior to the refreshing of the data in the cache memory and, after the refreshing of the data in the cache memory, the refresh indicator of "false" is written into the cache memory.

4. The method of claim 1, further comprising determining that the data in the cache memory is stale and refreshing the stale data in cache memory with updated data.

5. The method of claim 1, wherein the data in the cache memory is refreshed during a time period in which the refreshed data will not become stale prior to a next login by a user.

6. The method of claim 1, wherein the data in the cache memory comprises an aggregation of permissions provided in a storage system remotely from a system comprising the cache memory.

7. The method of claim 1, wherein the refreshing of the data occurs during non-peak usage of resources.

8. The method of claim 1, wherein the setting of the refresh indicator to "true" occurs at a login of a user and remains "true" until the refreshing of the data occurs, at which stage thereafter, the refresh indicator is set to "false".

9. The method of claim 1, wherein the refreshing of the data in the cache memory is a bulk job process.

10. The method of claim 1, wherein the refreshing of the cache memory is adjusted for weekends and a holiday.

11. The method of claim 10, wherein the refreshing of the cache memory occurs on a Sunday evening when a login occurred on a Friday.

12. The method of claim 10, wherein the refreshing occurs over every day of the holiday and the refresh indicator remains set to "true" even after a refresh of the data in the cache memory.

13. A computer program product comprising one or more non-transitory computer readable storage media having program instructions collectively stored on the one or more non-transitory computer readable storage media, the program instructions executable to:
set a refresh indicator in a cache memory to "true" upon a login of a user;
refresh data in the cache memory during non-peak usage of system resources when the refresh indicator is set to "true" and at a time in which the data will not become stale during a next login of the user; and
set the refresh indicator to "false" upon the refreshing of the data in the cache memory, indicating another refresh is not authorized,
wherein the refresh indicator remains "true" upon the refreshing of the data in the cache memory during one or more non-working days and wherein the refresh indicator resets to "false" upon the refreshing of the data in the cache memory prior to a first day after the non-working day.

14. The computer program product of claim 13, wherein the refresh indicator remains "true" upon the refreshing of the data in the cache memory during one or more days of a holiday.

15. The computer program product of claim 14, wherein the refreshing occurs over every day of the holiday and the refresh indicator is set to "false" upon a last refresh of the data in the cache memory.

16. The computer program product of claim 14, wherein the refresh indicator resets to "false" upon the refreshing of the data in the cache memory prior to a first day after the holiday.

17. The computer program product of claim 13, wherein a login of the user occurs on a last day of a work week, and the refreshing of the data occurs prior to a first day of a subsequent work week in which the user returns to work.

18. The computer program product of claim 13, wherein the refreshing of the data in the cache memory is a bulk job process for every daily user of a system.

19. The computer program product of claim 18, wherein the refreshing of the data comprises refreshing permissions.

20. A system comprising:
a processor, a computer readable memory, one or more computer readable storage media, and program instructions collectively stored on the one or more computer readable storage media, the program instructions executable to:
read cache data from a cache memory of a user;
determine, at a first time, that the cache data in the cache memory is stale;
refresh the cache data that is stale with updated data from a storage system remote from the cache memory;
determine, at a second time, that the cache data is not stale;
set a refresh indicator to "true" and write the "true" into the cache memory; and
perform a bulk refresh process of the cache data in the cache memory comprising:
reading the cache memory to determine that the refresh indicator is "true";
refreshing the cache data in the cache memory with updated information within a time period in which the updated information will not become stale for when the user next requires the cache data; and
resetting the refresh indicator to "false" subsequent to the refreshing of the cache data in the cache memory prior to a first day after a holiday.

* * * * *